(12) United States Patent
Devane et al.

(10) Patent No.: US 11,575,708 B2
(45) Date of Patent: Feb. 7, 2023

(54) ICON BASED PHISHING DETECTION

(71) Applicant: McAfee, LLC, Santa Clara, CA (US)

(72) Inventors: Oliver Devane, Upton (GB); Rafael Pena, Bucks (GB); Abhishek Karnik, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 159 days.

(21) Appl. No.: 16/888,141

(22) Filed: May 29, 2020

(65) Prior Publication Data
US 2021/0377300 A1    Dec. 2, 2021

(51) Int. Cl.
*H04L 9/40* (2022.01)
*H04L 9/06* (2006.01)

(52) U.S. Cl.
CPC ........ *H04L 63/1483* (2013.01); *H04L 9/0643* (2013.01); *H04L 63/1416* (2013.01)

(58) Field of Classification Search
CPC .............. H04L 9/0643; H04L 63/1483; H04L 63/1416
See application file for complete search history.

(56) References Cited

U.S. PATENT DOCUMENTS

| | | | | |
|---|---|---|---|---|
| 7,831,824 B2* | 11/2010 | Abdulhayoglu | ...... | H04L 63/123 705/76 |
| 2007/0055749 A1* | 3/2007 | Chien | ................. | H04L 63/1491 709/219 |
| 2020/0036751 A1* | 1/2020 | Kohavi | ............... | H04L 63/1483 |
| 2020/0204587 A1* | 6/2020 | Hunt | .................... | G06F 21/128 |
| 2021/0084054 A1* | 3/2021 | Young | ................. | H04L 63/1416 |
| 2021/0377300 A1* | 12/2021 | Devane | ................ | H04L 9/0643 |

FOREIGN PATENT DOCUMENTS

| | | | | |
|---|---|---|---|---|
| CN | 105653959 | | 6/2016 | |
| EP | 2729895 | | 5/2014 | |
| EP | 3599753 A1 * | | 1/2020 | ......... H04L 63/1416 |

(Continued)

OTHER PUBLICATIONS

International Searching Authority, "International Search Report," dated Aug. 16, 2021 in connection with International Patent Application No. PCT/US2021/034962, 3 pages.

(Continued)

*Primary Examiner* — Ponnoreay Pich
(74) *Attorney, Agent, or Firm* — Hanley, Flight & Zimmerman, LLC

(57) ABSTRACT

An apparatus for detecting a phishing website based on website icons is disclosed. A disclosed example apparatus includes a parser to locate a first website icon corresponding to a first website, an icon hasher to generate a first hash of the first website icon, and a hash checker to determine whether the first hash matches a second hash of a second website icon corresponding to a second website in an icon hash database, the hash checker to, in response to the first hash matching the second hash, determine whether a first portion of a first Uniform Resource Locator (URL) corresponding to the first website matches a second portion of a second URL corresponding to the second website, the hash checker to, in response to the first portion not matching the second portion, identify the first website as a phishing website.

28 Claims, 8 Drawing Sheets

(56) References Cited

FOREIGN PATENT DOCUMENTS

WO 2021243272 12/2021

OTHER PUBLICATIONS

International Searching Authority, "Written Opinion," dated Aug. 16, 2021 in connection with International Patent Application No. PCT/US2021/034962, 8 pages.
International Searching Authority, "International Preliminary Report on Patentability," dated Dec. 8, 2022 in connection with International Patent Application No. PCT/US2021/034962, 10 pages.

\* cited by examiner

ICON BASED PHISHING DETECTION

FIELD OF THE DISCLOSURE

This disclosure relates generally to phishing, and, more particularly, to icon based phishing detection.

BACKGROUND

In recent years, phishing websites disguised as legitimate websites have been used to convince Internet users to unknowingly divulge personal information (e.g., bank account numbers, social security number, etc.). Detection and/or blocking of such phishing websites can protect Internet users from privacy breaches. However, phishing websites can be difficult to detect because they often appear very similar or identical to a known legitimate website.

Figure 1:
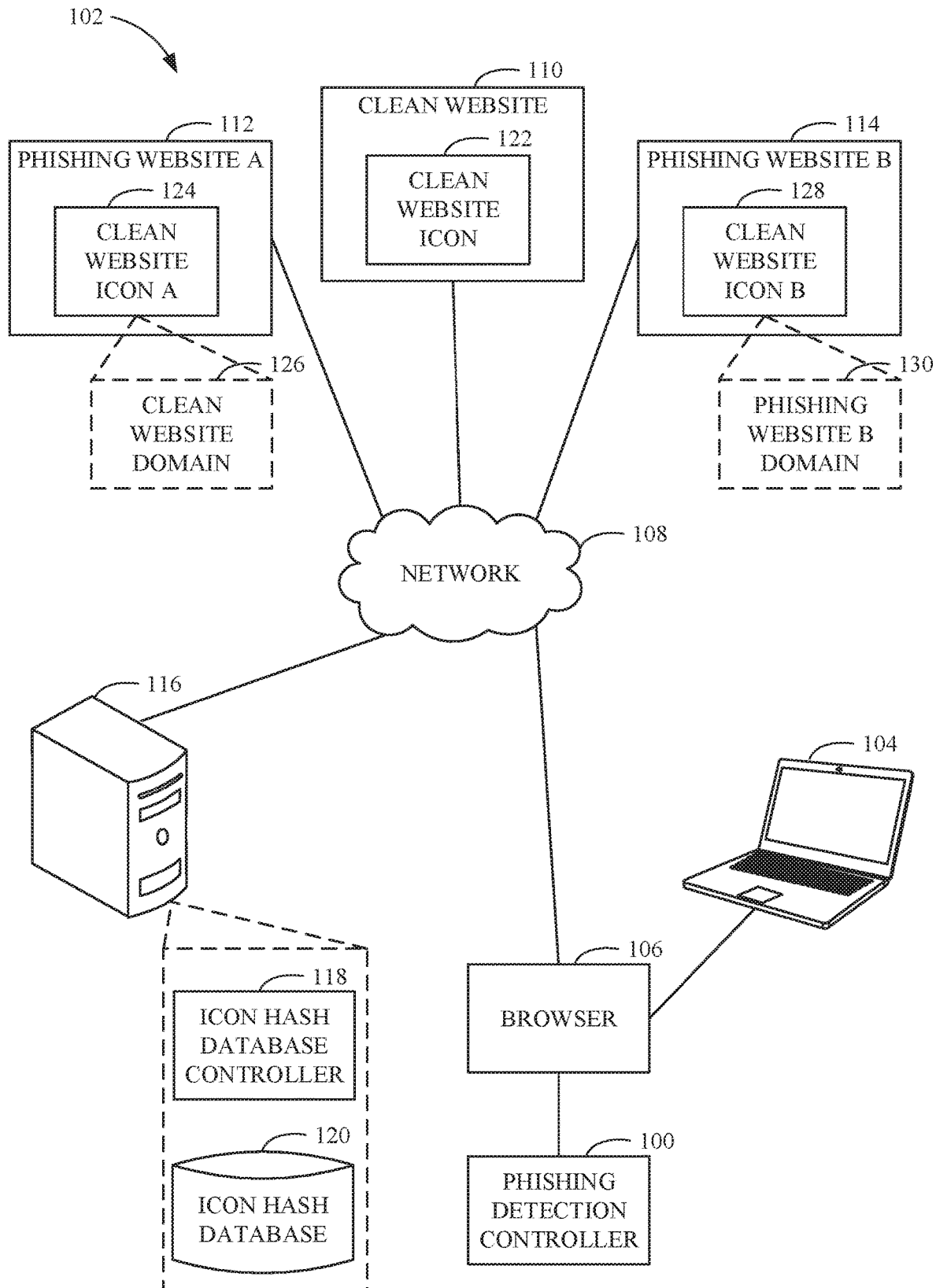
FIG. 1 illustrates an example phishing detection controller in accordance with the teachings of this disclosure implemented in an example environment.

The figures are not to scale. Instead, the thickness of the layers or regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A website typically includes an icon (e.g., a favicon, a shortcut icon, a website icon) associated with the website. The icon is used to identify the website to an Internet user. Typically, the icon of a website is referenced in a HyperText Markup Language (HTML) code of the website. In some examples, such reference may be omitted, causing a browser (or another application) to attempt to utilize an icon at a default and/or otherwise standardized location. As used herein, a phishing website is defined to be an illegitimate website that attempts to solicit information from a user while masquerading as a corresponding legitimate site. A phishing website sometimes re-uses the icon of the corresponding legitimate website (e.g., clean website) for use on the phishing website to make the phishing website seem legitimate to the Internet user. In such cases, the phishing website can reference the icon to a domain of the legitimate website in the HTML code of the phishing website. The use of the icon by the phishing website can trick the user into believing that the phishing website is the legitimate website.

Examples disclosed herein can be used to detect whether a website visited by an Internet user is a phishing website or a legitimate website. Further, examples disclosed herein enable phishing detection by determining whether an icon (e.g., a favicon, a shortcut icon, a website icon) of a website is legitimate. In particular, examples disclosed herein determine whether the icon is referenced to a different domain than a domain of the website and, in response to determining that the icon is referenced to a different domain, identify the website as a phishing website. Additionally or alternatively, examples disclosed herein generate a hash of the icon and compare the hash to a database, where the database stores icon hash entries corresponding to known legitimate websites. In response to determining that the hash matches an icon hash entry corresponding to a known legitimate website, examples disclosed herein identify the website as a phishing website. Further, in response to identifying the website as a phishing website, examples disclosed herein can notify the user that the website is a phishing website and/or can block the user from accessing the website.

FIG. 1 illustrates an example phishing detection controller 100 in accordance with the teachings of this disclosure implemented in an example environment 102. The example environment 102 includes the phishing detection controller 100, an example user device 104, an example browser 106, an example network 108, an example clean website 110, an example phishing website A 112, an example phishing website B 114, and an example central server 116. The example central server 116 includes an example icon hash database controller 118 and an example icon hash database 120. The example clean website 110 includes an example clean website icon 122. The example phishing website A 112 includes an example clean website icon A 124, associated with an example clean website domain 126. The example phishing website B 114 includes an example clean website icon B 128, associated with an example phishing website B domain 130.

In the illustrated example of FIG. 1, the example user device 104 is operated by a user to access one or more websites (e.g., the clean website 110, the phishing website A 112, and/or the phishing website B 114) via the network 108. The user device 104 is in communication with the network 108 (e.g., the Internet) via a network interface (e.g., an Ethernet Interface). In the illustrated example of FIG. 1, the user device 104 is implemented as a laptop computer. However, in other examples, the user device 104 may be implemented by any other past, present, or future type of computing device, such as a desktop computer, a mobile device, a tablet, a mobile phone, etc.

In the illustrated example of FIG. 1, the browser (e.g., web browser) 106 is implemented using executable instructions executed by one or more processors of the user device 104. The example browser 106 provides an interface (e.g., via a display of the user device 104) by which a user can access a website via the network 108. The browser 106 receives requests from the user device 104 to access one or more websites on the network 108. The browser 106 displays the one or more websites on the user device 104. In examples disclosed herein, the phishing detection controller 100 is implemented as a browser extension to interface with the browser 106. However, the phishing detection controller 100 may be implemented in any other past, present, or future fashion. In some examples, the phishing detection controller 100 can be implemented on the user device 104 as an anti-virus package, the phishing detection controller 100 may be implemented as a standalone program, the phishing detection controller 100 may be implemented as a plug-in, etc.

In the illustrated example of FIG. 1, the clean website (e.g., legitimate website) 110 is accessible via the browser 106. The clean website 110 is a website identified by the icon hash database controller 118 to be legitimate (e.g., not used for phishing). The clean website includes the clean website icon 122, which is hosted at a domain of the clean website.

In the illustrated example of FIG. 1, the phishing website A 112 is a first phishing website of the example environment 102. The phishing website A 112 is disguised as and/or copies the appearance of the clean website 110 to convince the user, in response to the user visiting the phishing website A 112, that the phishing website A 112 is the clean website 110. The phishing website A 112 includes the clean website icon A 124, where the clean website icon A 124 is the same icon as the clean website icon 122 of the clean website 110. In the illustrated example, the clean website 110 is associated with a first website domain (e.g., www.bank.com, the clean website domain 126) and the phishing website A 112 is associated with a second website domain (e.g., www.fakebankA.com). However, both the clean website icon 122 and the clean website icon A 124 are hosted at the www.bank.com domain (e.g., the first website domain, the clean website domain 126).

In the illustrated example of FIG. 1, the phishing website B 114 is a second phishing website of the example environment 102. The phishing website B 114 is disguised as and/or copies the appearance of the clean website 110 to convince the user, in response to the user visiting the phishing website B 114, that the phishing website B 114 is the clean website 110. The phishing website B 114 includes the clean website icon B 128, where the clean website icon B 128 is the same icon as the clean website icon 122 of the clean website 110. In the illustrated example, the phishing website B 114 is associated with a third website domain (e.g., www.fakebankB.com, the phishing website B domain 130). In the illustrated example, the clean website icon B 128 is hosted at the www.fakebankB.com domain (e.g., the third website domain, the phishing website B domain 130) instead of the www.bank.com domain.

In the illustrated example of FIG. 1, the central server 116 communicates via the network 108 to the user device 104. In the illustrated example of FIG. 1, the central server 116 includes the icon hash database controller 118 and/or the icon hash database 120. The example icon hash database controller 118 is to generate and/or update the icon hash database 120. In some examples, the icon hash database controller 118 and/or the icon hash database 120 can be stored in a different location from the central server 116. In some examples, the central server 116 allows the user device 104 to access the icon hash database 120 via the network 108.

In the illustrated example of FIG. 1, the example icon hash database controller 118 generates one or more hash entries to be stored in the icon hash database 120. The example icon hash database controller 118 generates each of the one or more hash entries based on a respective known legitimate website, such as the clean website 110. In some examples, the icon hash database controller 118 is configured to continuously and/or periodically update the icon hash database 120. The icon hash database controller updates the icon hash database 120 by updating the stored information of the existing hash entries and/or generating new hash entries based on new known legitimate websites.

In the illustrated example of FIG. 1, the icon hash database 120 stores one or more hash entries generated by the icon hash database controller 118. In the illustrated example of FIG. 1, each of the one or more hash entries corresponds to a known legitimate website. In some examples, each hash entry includes at least one of an icon hash corresponding to the known legitimate website and/or a URL (or a portion thereof, such as, for example, a domain name) corresponding to a known legitimate website. In the illustrated example of FIG. 1, the example icon hash database 120 is implemented by any memory, storage device and/or storage disc for storing data such as, for example, flash memory, magnetic media, optical media, solid state memory, hard drive(s), thumb drive(s), etc. Furthermore, the data stored in the example icon hash database 120 may be in any data format such as, for example, binary data, comma delimited data, tab delimited data, structured query language (SQL) structures, etc. While, in the illustrated example, the example icon hash database 120 is illustrated as a single device, the example icon hash database 120 and/or any other data storage devices described herein may be implemented by any number and/or type(s) of memories.

In the illustrated example of FIG. 1, the example phishing detection controller 100 determines whether a website visited by the user device 104 is a phishing website or a legitimate website based on an icon of the website. In some examples, in response to the phishing detection controller 100 determining that the website is a phishing website, the phishing detection controller 100 warns the user via a message to the user device and/or blocks the user device from accessing the website.

In examples disclosed herein, the example icon hash database controller 118 and/or the example phishing detection controller 100 is/are implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc.

Figure 2:
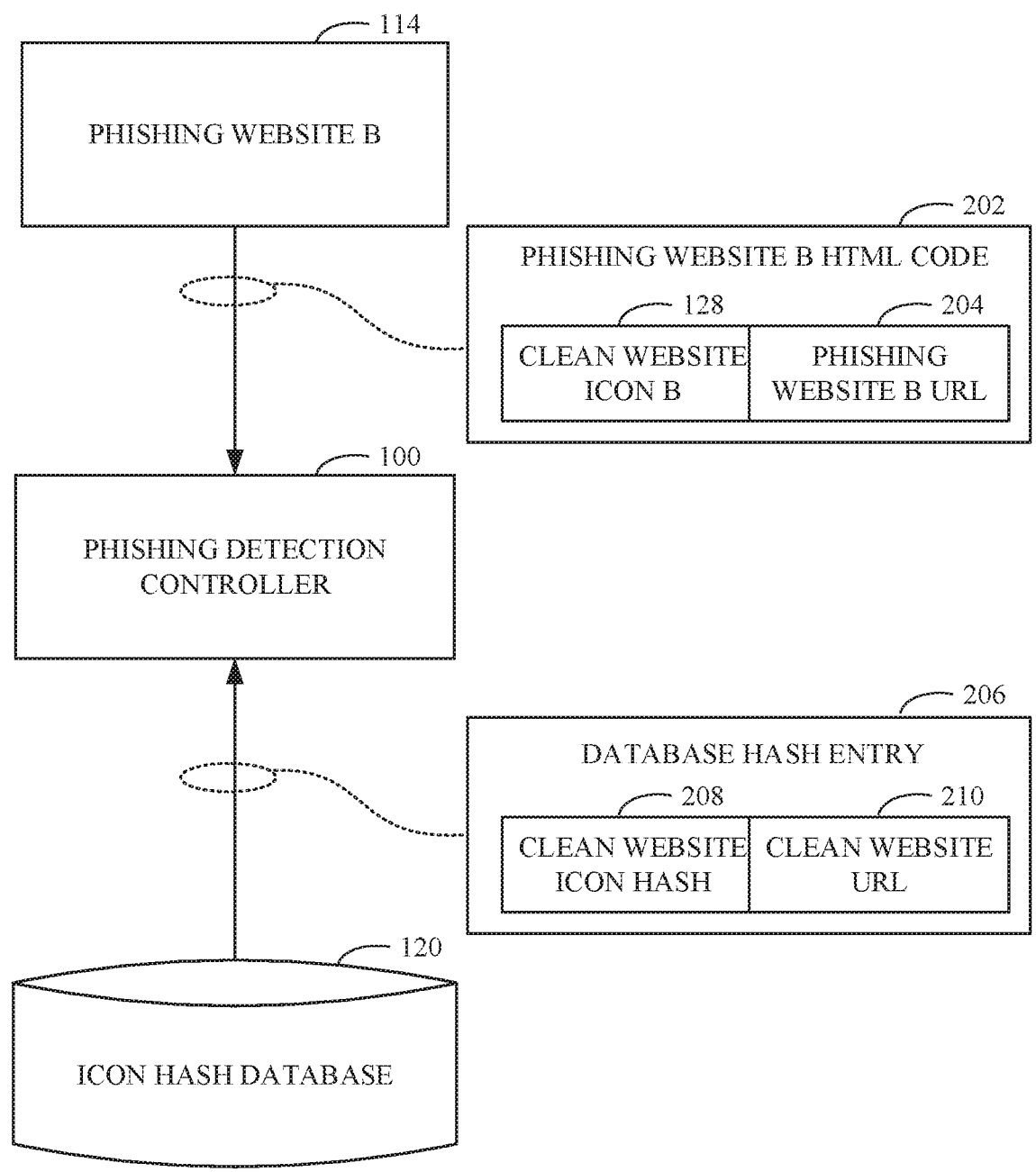
FIG. 2 illustrates an example implementation of phishing detection controller of FIG. 1 to determine whether a website is a phishing website based on a uniform resource locator (URL) of the website and an icon of the website.

FIG. 2 illustrates an example implementation of phishing detection controller 100 of FIG. 1 to determine whether a website (e.g., the phishing website B 114 of FIG. 1) is a phishing website based on a URL of the website and an icon (e.g., the clean website icon B 128 of FIG. 1) of the website. In the illustrated example of FIG. 2, the phishing website B 114 further includes phishing website B HTML code 202. The phishing website B HTML code 202 further includes a reference to the clean website icon B 128 of FIG. 1, and a phishing website B URL 204 associated with the phishing website B 114. In the illustrated example, the example phishing detection controller 100 accesses a database hash entry 206 from the icon hash database 120 of FIG. 1. The database hash entry 206 includes a clean website icon hash 208, and a clean website URL 210 associated with the clean website 110 of FIG. 1.

In the illustrated example of FIG. 2, the phishing website B HTML code 202 represents HTML code sent by the phishing website B 114 to the user device 104 of FIG. 1. In response to the user device 104 of FIG. 1 visiting the phishing website B 114, the phishing detection controller 100 retrieves the phishing website B HTML code 202 of the phishing website B 114. In the illustrated example, the phishing detection controller 100 parses the phishing website B HTML code 202 to locate a reference to the clean website icon B 128 and/or the phishing website B URL 204. In some examples, the phishing detection controller 100 downloads the clean website icon B 128 and generates a hash of the clean website icon B 128 based on a hashing algorithm implemented in the phishing detection controller 100. As used herein, the hashing algorithm is a function that maps data (e.g., a website icon) to a hash value. For example, the hashing algorithm can be one of an MD5 hash function, an SHA-1 hash function, a RIPEMD-160 hash function, or another type of hash function.

In the illustrated example of FIG. 2, the example icon hash database 120 includes the example database hash entry 206. In the illustrated example, the database hash entry 206 is associated with the clean website 110 of FIG. 1. In some examples, the database hash entry 206 is one hash entry of a plurality of hash entries in the icon hash database 120. In some examples, an entry of the plurality of hash entries corresponds to a known legitimate website. In some examples, one or more of the hash entries correspond to a known phishing website. In such examples, the hash entries include a flag to indicate whether a website associated with a hash entry is legitimate. In the illustrated example, the database hash entry 206 includes the clean website icon hash 208 and the clean website URL 210 associated with the clean website 110. Additionally or alternatively, the database hash entry 206 can include other data associated with the clean website 110. Such other data may include, for example, a hash of the content of the website, a timestamp indicating the time at which the hash of the icon was computed, a flag indicating whether the hash entry corresponds to a legitimate website, etc. In the illustrated example, the clean website icon hash 208 is a hash of the clean website icon 122 of FIG. 1. The icon hash database controller 118 of FIG. 1 generates the clean website icon hash 208 based on the hashing algorithm of the phishing detection controller 100.

In the illustrated example of FIG. 2, the phishing detection controller 100 generates the hash of the clean website icon B 128. The phishing detection controller 100 determines whether the hash of the clean website icon B 128 matches an existing icon hash in the plurality of hash entries of the icon hash database 120. In the illustrated example of FIG. 2, the phishing detection controller 100 determines that the hash of the clean website icon B 128 matches the clean website icon hash 208 of the database hash entry 206. In response to the phishing detection controller 100 determining that the hash of the clean website icon B 128 matches the clean website icon hash 208, the phishing detection controller 100 retrieves the database hash entry 206. In the illustrated example, the phishing detection controller 100 compares the phishing website B URL 204 to a URL of the database hash entry 206 corresponding to the clean website icon hash 208 (e.g., the clean website URL 210). In response to the phishing detection controller 100 determining that the phishing website B URL 204 does not match the clean website URL 210, the phishing detection controller 100 determines that the phishing website B 114 is a phishing website.

Figure 3:
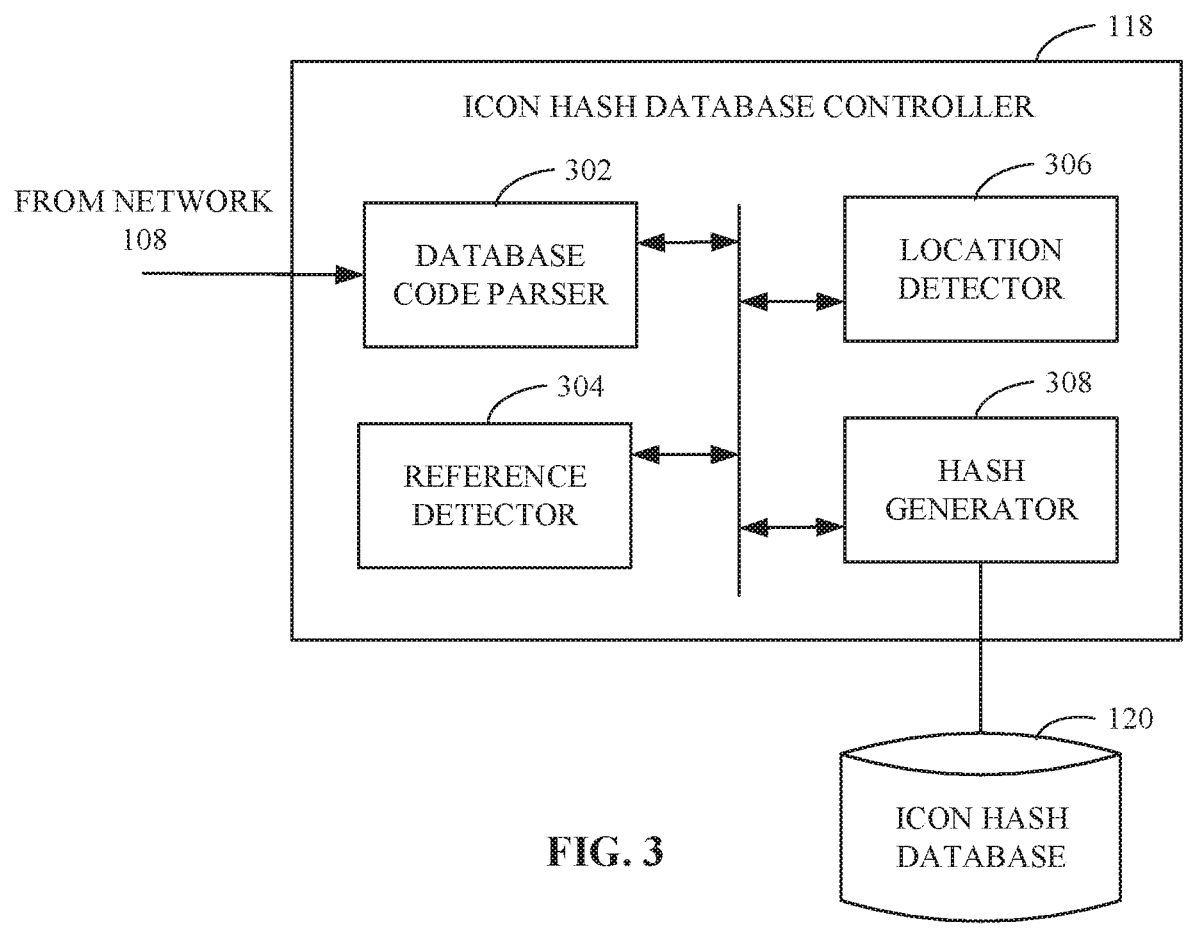
FIG. 3 is a block diagram of an example icon hash database controller of FIG. 1 implemented to generate a plurality of hash entries of an example icon hash database.

FIG. 3 is a block diagram of the example icon hash database controller 118 of FIG. 1 implemented to generate the plurality of hash entries of the example icon hash database 120 of FIGS. 1 and 2. In the illustrated example of FIG. 3, the example icon hash database controller 118 includes an example database code parser 302, an example reference detector 304, an example location detector 306, and an example hash generator 308. In the illustrated example of FIG. 3, the example icon hash database controller 118 retrieves HTML code from one or more known legitimate websites via the network 108 of FIG. 1. The example icon hash database controller 118 generates a hash entry corresponding to each of the one or more known legitimate websites.

The example database code parser 302 of the illustrated example of FIG. 3 parses the HTML code retrieved from one of the known legitimate websites. In examples disclosed herein, the parsed HTML code includes at least one of a reference to a website icon (e.g., the clean website icon 122 of FIG. 1) of the legitimate website or a URL (e.g., the clean website URL 210 of FIG. 2) of the legitimate website.

The example reference detector 304 of the illustrated example of FIG. 3 retrieves the parsed HTML code from the database code parser 302. The example reference detector 304 determines whether the parsed HTML code includes a reference to a website icon of the legitimate website. In response to the reference detector 304 determining that the parsed HTML code includes a reference to a website icon, the example reference detector 304 directs the example hash generator 308 to download the website icon. Alternatively, in response to the reference detector 304 determining that the parsed HTML code does not include a reference to a website icon, the reference detector 304 invokes the location detector 306.

The example location detector 306 of the illustrated example of FIG. 3, in response to the reference detector 304 determining that the parsed HTML code does not include a reference to a website icon, determines whether the website icon of the legitimate website is located at a standard (e.g., typical, expected) location. In response to the location detector 306 locating the website icon at the standard location, the location detector 306 directs the hash generator 308 to download the website icon. Alternatively, in response to the location detector 306 not locating the website icon at the standard location, the location detector 306 determines that the legitimate website does not include a website icon.

The example hash generator 308 of the illustrated example of FIG. 3 downloads the website icon of the legitimate website and generates a hash of the website icon based on the hashing algorithm of the icon hash database controller 118 and/or the phishing detection controller 100 of FIG. 1. In the illustrated example, the hash generator 308 further generates a hash entry corresponding to the legitimate website. The hash entry includes the hash of the website icon and/or the URL of the legitimate website. In the illustrated example, the hash generator 308 is in communication with the icon hash database 120 of FIGS. 1 and 2. In response to the hash generator 308 generating the hash entry corresponding to the legitimate website, the hash generator 308 transmits the hash entry to the icon hash database 120 to be stored with the plurality of hash entries of the icon hash database 120.

In the illustrated example of FIG. 3, the example database code parser 302, the example reference detector 304, the example location detector 306, and/or the example hash generator 308 is/are implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc.

While an example manner of implementing the icon hash database controller 118 of FIG. 1 is illustrated in FIG. 3, one or more of the elements, processes and/or devices illustrated in FIG. 3 may be combined, divided, re-arranged, omitted, eliminated and/or implemented in any other way. Further, the example database code parser 302, the example reference detector 304, the example location detector 306, the example hash generator 308 and/or, more generally, the example icon hash database controller 118 of FIG. 3 may be implemented by hardware, software, firmware and/or any combination of hardware, software and/or firmware. Thus, for example, any of the example database code parser 302, the example reference detector 304, the example location detector 306, the example hash generator 308 and/or, more generally, the example icon hash database controller 118 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database code parser 302, the example reference detector 304, the example location detector 306, and/or the example hash generator 308 is/are hereby expressly defined to include a non-transitory computer readable storage device or storage disk such as a memory, a digital versatile disk (DVD), a compact disk (CD), a Blu-ray disk, etc. including the software and/or firmware. Further still, the example icon hash database controller 118 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
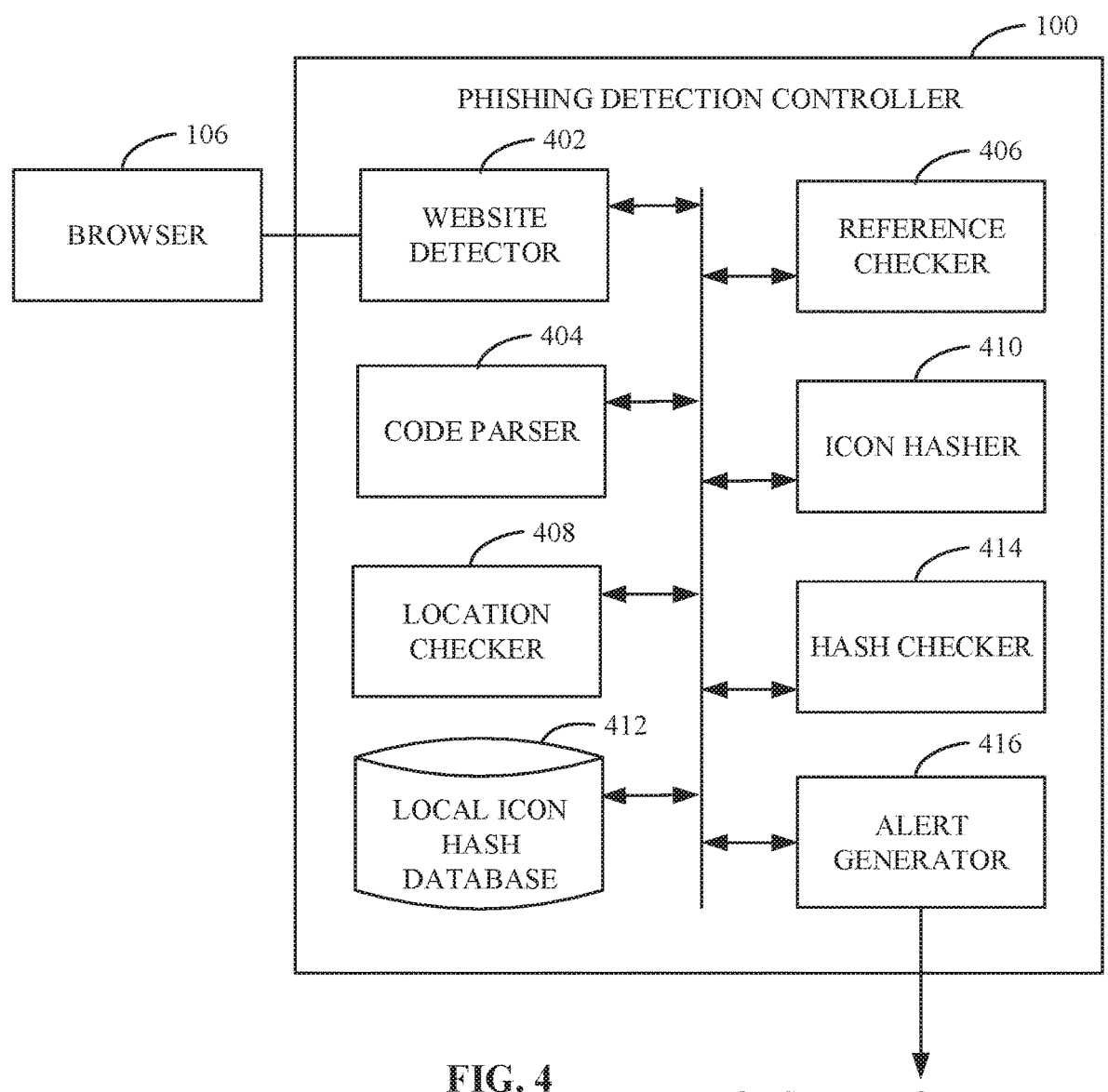
FIG. 4 is a block diagram of the example phishing detection controller of FIGS. 1 and/or 2 implemented to determine whether an unknown website visited by an example user device is a phishing website or a legitimate website.

FIG. 4 is a block diagram of the example phishing detection controller 100 of FIGS. 1 and/or 2 implemented to determine whether an unknown website visited by the user device 104 is a phishing website or a legitimate website. The example phishing detection controller 100 includes an example website detector 402, an example code parser 404, an example reference checker 406, an example location checker 408, an example icon hasher 410, an example local icon hash database 412, an example hash checker 414, and an example alert generator 416. In the illustrated example of FIG. 4, a user of the user device 104 navigates to an unknown website (e.g., visited website, the phishing website A 112 of FIG. 1, the phishing website B 114 of FIGS. 1 and 2).

The example website detector 402 is in communication with the browser 106 of FIG. 1 and/or a component of the browser 106 to detect when a user of the user device 104 has navigated to a website. In response to the website detector 402 detecting that the user device 104 is loading the unknown website, the example web detector 402 retrieves HTML code associated with the unknown website.

The example code parser 404 of the illustrated example of FIG. 4, in response to the phishing detection controller 118 retrieving the HTML code of the unknown website, code parser 404 parses the HTML code. The parsed HTML code may include a reference to a website icon (e.g., the clean website icon A 124 of FIG. 1, the clean website icon B 128 of FIGS. 1 and 2) to be used when displaying the unknown website. In some examples, the reference to the website icon may be a reference to a file (e.g., an icon file) provided by a same domain as the unknown website.

The example reference checker 406 in the illustrated example of FIG. 4 retrieves the parsed HTML code from the code parser 404 and determines whether the parsed HTML code includes a reference to a website icon for the unknown website. In response to the reference checker 406 determining that the parsed HTML code does not include a reference to a website icon, the reference checker 406 invokes the location checker 408.

Alternatively, in response to the reference detector 304 determining that the parsed HTML code includes a reference to a website icon, the reference checker 406 determines a referenced domain of the website icon (e.g., the clean website icon A 124 of FIG. 1). In response to the reference checker 406 determining that the referenced domain does not match a domain of the unknown website, the reference checker 406 informs the alert generator 416 that the unknown website is a phishing website. For example, in response to the unknown website being the phishing website A 112 of FIG. 1, the reference checker 406 determines that the referenced domain (e.g., the clean website domain 126 of FIG. 1) of the website icon (e.g., the clean website icon A) does not match the domain (e.g., a phishing website A 112 domain) of the unknown website. Thus, in this example, the reference checker determines that the unknown website (e.g., the phishing website A 112) is a phishing website.

In another example, in response to the unknown website being the phishing website B 114, the reference checker 406 determines that the referenced domain (e.g., the phishing website B domain 130 of FIG. 1) matches the domain of the unknown website (e.g., the phishing website B 114). In such examples, where the reference checker 406 determines that the referenced domain matches the domain of the unknown website, the reference checker 406 invokes the icon hasher 410.

The example location checker 408 in the illustrated example of FIG. 4, in response to the reference checker 406 determining that the parsed HTML code does not include a reference to a website icon, determines whether a website icon of the visited website is located at the standard (e.g., typical, expected) location. In response to the location checker 408 locating a website icon at the standard location, the location checker 408 invokes the icon hasher 410. Alternatively, in response to the location checker 408 not locating a website icon at the standard location, the location detector 306 determines that the unknown website does not include a website icon. In such examples (e.g., where a website icon is not located), the phishing detection controller 100 is unable to determine whether the unknown website is a phishing website or a legitimate website.

The example icon hasher 410 in the illustrated example of FIG. 4 downloads the website icon of the unknown website and generates a hash of the website icon based on the hashing algorithm of the phishing detection controller 100. In the illustrated example, the icon hasher 410 sends the hash of the website icon to the example hash checker 414.

The example local icon hash database 412 of the illustrated example of FIG. 4 stores one or more of the hash entries from the plurality of hash entries of the icon hash database 120 of FIGS. 1, 2, and 3. In some examples, the example local icon hash database 412 enables the phishing detection controller 100 to determine whether the unknown website is a phishing website without the phishing detection controller 100 accessing the icon hash database 120. In some examples, the hash entries of the local icon hash database 412 are initialized by the phishing detection controller 100 upon implementation of the phishing detection controller 100 on the user device 104 and/or the browser 106 of FIG. 1. In such examples, the phishing detection controller 100 selects one or more of the hash entries of the icon hash database 120 and stores the downloaded hash entries in the local icon hash database 412. In some examples, the selected hash entries of the local icon hash database 412 correspond to legitimate websites that are more likely to be the target of phishing attempts (e.g., websites for financial institutions). In some examples, the phishing detection controller 100 periodically updates the hash entries of the local icon hash database 412 by downloading new hash entries from the icon hash database 120. In some examples, the phishing detection controller 100 updates the hash entries of the local icon hash database 412 in response to a command from the user device 104 and/or the central server 116 of FIG. 1.

In the illustrated example of FIG. 4, the example local icon hash database 412 is implemented by any memory, storage device and/or storage disc for storing data such as, for example, flash memory, magnetic media, optical media, solid state memory, hard drive(s), thumb drive(s), etc. Furthermore, the data stored in the example local icon hash database 412 may be in any data format such as, for example, binary data, comma delimited data, tab delimited data, structured query language (SQL) structures, etc. While, in the illustrated example, the example local icon hash database 412 is illustrated as a single device, the example local icon hash database 412 and/or any other data storage devices described herein may be implemented by any number and/or type(s) of memories.

The example hash checker 414 in the illustrated example of FIG. 4 determines whether the hash of the website icon matches an icon hash of a hash entry in the local icon hash database 412 and/or the icon hash database 120. In some examples, the example hash checker 414 is configured to search the hash entries of the local icon hash database 412 and identify a matching icon hash from the hash entries of the local icon hash database 412. In some examples, in response to the example hash checker 414 not identifying a matching icon hash from the local icon hash database 412, the example hash checker 414 searches the hash entries of the icon hash database 120 to identify the matching icon hash. In some examples, in response to the example hash checker 414 not identifying a matching icon hash from at least one of the local icon hash database 412 or the icon hash database 120, the phishing detection controller 100 is unable to determine whether the unknown website is a phishing website or a legitimate website.

Alternatively, in response to the example hash checker 414 identifying a matching icon hash from at least one of the local icon hash database 412 or the icon hash database 120, the example hash checker 414 retrieves a matching hash entry from the respective database (e.g., the local icon hash database 412 or the icon hash database 120). In the illustrated example of FIG. 4, the matching hash entry includes the matching icon hash and the URL of a known legitimate website corresponding to the matching icon hash. The hash checker 414 compares the URL from the matching hash entry to the URL of the unknown website. In response to the hash checker 414 determining that the URL from the matching hash entry matches the URL of the unknown website, the hash checker 414 determines that the unknown website is a legitimate website. Alternatively, in response to the hash checker 414 determining that the URL from the matching hash entry does not match the URL of the unknown website, the hash checker 414 determines that the unknown website is a phishing website. In some examples, in response to the hash checker 414 determining that the unknown website is a phishing website, the hash checker 414 invokes the example alert generator 416.

The example alert generator 416 in the illustrated example of FIG. 4 is in communication with the user device 104. In the illustrated example of FIG. 4, in response to the reference checker 406 and/or the hash checker 414 determining that the unknown website is a phishing website, the example alert generator 416 at least one of alerts a user of the user device 104 (e.g., via a message to the user device 104) that the unknown website is a phishing website, or blocks the user device 104 from further accessing the unknown website.

In the illustrated example of FIG. 4, the example website detector 402, the example code parser 404, the example reference checker 406, the example location checker 408, the example icon hasher 410, the example hash checker 414, and the example alert generator 416 are implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc.

While an example manner of implementing the phishing detection controller 100 of FIGS. 1 and/or 2 is illustrated in FIG. 4, one or more of the elements, processes and/or devices illustrated in FIG. 4 may be combined, divided, re-arranged, omitted, eliminated and/or implemented in any other way. Further, the example website detector 402, the example code parser 404, the example reference checker 406, the example location checker 408, the example icon hasher 410, the example local icon hash database 412, the example hash checker 414, the example alert generator 416 and/or, more generally, the example phishing detection controller 100 of FIG. 4 may be implemented by hardware, software, firmware and/or any combination of hardware, software and/or firmware. Thus, for example, any of the example website detector 402, the example code parser 404, the example reference checker 406, the example location checker 408, the example icon hasher 410, the example local icon hash database 412, the example hash checker 414, the example alert generator 416 and/or, more generally, the example phishing detection controller 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example website detector 402, the example code parser 404, the example reference checker 406, the example location checker 408, the example icon hasher 410, the example local icon hash database 412, the example hash checker 414, and/or the example alert generator 416 is/are hereby expressly defined to include a non-transitory computer readable storage device or storage disk such as a memory, a digital versatile disk (DVD), a compact disk (CD), a Blu-ray disk, etc. including the software and/or firmware. Further still, the example phishing detection controller 100 of FIG. 4 may include one or more elements, processes and/or devices in addition to, or instead of, those illustrated in FIG. 4, and/or may include more than one of any or all of the illustrated elements, processes and devices. As used herein, the phrase "in communication." including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
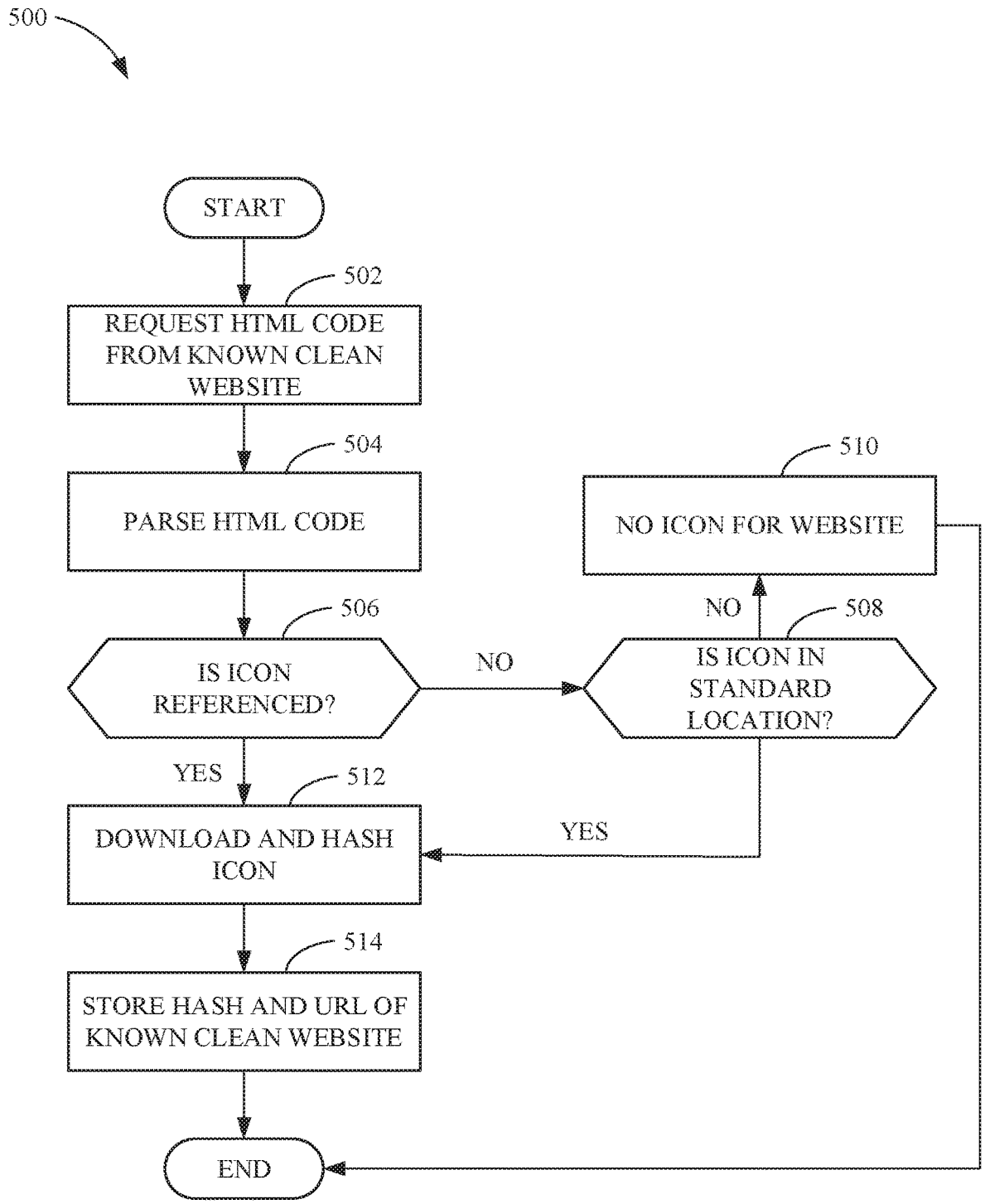
FIG. 5 is a flowchart representative of machine readable instructions which may be executed to implement the example icon hash database controller of FIGS. 1 and/or 3 to generate a hash entry of the example icon hash database of FIGS. 1, 2, and/or 3.

Flowcharts representative of example hardware logic, machine readable instructions, hardware implemented state machines, and/or any combination thereof for implementing the icon hash database controller 118 of FIGS. 1 and/or 3 and/or the phishing detection controller 100 of FIGS. 1, 2, and/or 4 are shown in FIGS. 5 and/or 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5 and/or 6, many other methods of implementing the example icon hash database controller 118 and/or the example phishing detection controller 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B. and/or C refers to any combination or subset of A. B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a". "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of machine readable instructions 500 which may be executed to implement the example icon hash database controller 118 of FIGS. 1 and/or 3 to generate a hash entry (e.g., the database hash entry 206 of FIG. 2) of the example icon hash database 120 of FIGS. 1, 2, and/or 3. The example instructions 500 begin as the central server 116 of FIG. 1 accesses a known legitimate website (e.g., known clean website, the clean website 110 of FIG. 1) via the network 108 of FIG. 1.

The icon hash database controller 118 requests HTML code from the known legitimate website (block 502) by sending a request to the known legitimate website via the network 108. In response to the icon hash database controller 118 sending the request, the known legitimate website sends HTML code associated with the known legitimate website to the icon hash database controller 118. In some examples, the known legitimate website is from a list of known legitimate websites provided to the icon hash database controller 118 from the central server 116.

The database code parser 302 parses the HTML code from the known legitimate website (block 504). In some examples, the parsed HTML code includes at least one of a reference to a website icon (e.g., the clean website icon 122 of FIG. 1) for the known legitimate website or a URL (e.g., the clean website URL 210 of FIG. 2) of the known legitimate website.

The reference detector 304 determines whether the parsed HTML code includes a reference to a website icon of the known legitimate website (block 506). In some examples, the HTML code defines a location for an icon. In other examples, a default location (e.g., standard location) for the website icon is assumed. In response to the reference detector 304 determining that the website icon of the known legitimate website is referenced in the parsed HTML code (e.g., block 506 returns a result of YES), control proceeds to block 512, where the hash generator 308 downloads the website icon and generates a hash of the website icon.

Returning to block 506, if the reference detector 304 determines that the website icon of the known legitimate website is not referenced in the parsed code (e.g., block 506 returns a result of NO), control proceeds to block 508, where the location detector 306 determines whether the website icon is located at the standard location.

The location detector 306 determines whether the website icon of the known legitimate website is located the standard location (block 508). In response to the location detector 306 locating the website icon at the standard location (e.g., block 508 returns a result of YES), the control proceeds to block 512, where the hash generator 308 downloads the website icon and generates a hash of the website icon.

Returning to block 508, in response to the location detector 306 not locating the website icon at the expected location (e.g., block 508 returns a result of NO), control proceeds to block 510, where the location detector 306 determines that no website icon exists for the known legitimate website.

The location detector 306 determines that no website icon exists for the known legitimate website (block 510) and, thus, the hash entry cannot be generated for the known legitimate website. The example process of FIG. 5 is then terminated.

The hash generator 308 downloads the website icon of the known legitimate website and generates a hash of the website icon (block 512). The hash generator 308 generates the hash of the website icon based on the hashing algorithm of the icon hash database controller 118 and/or the phishing detection controller 100 of FIG. 1.

The hash generator 308 stores the hash of the website icon and the URL corresponding to the known legitimate website (block 514) as a new hash entry in the icon hash database 120. The example process of FIG. 5 is then terminated. The example process of FIG. 5 may be repeated for other known clean websites (e.g., a list of known clean websites may be iterated upon to create hashes for known clean websites).

Figure 6:
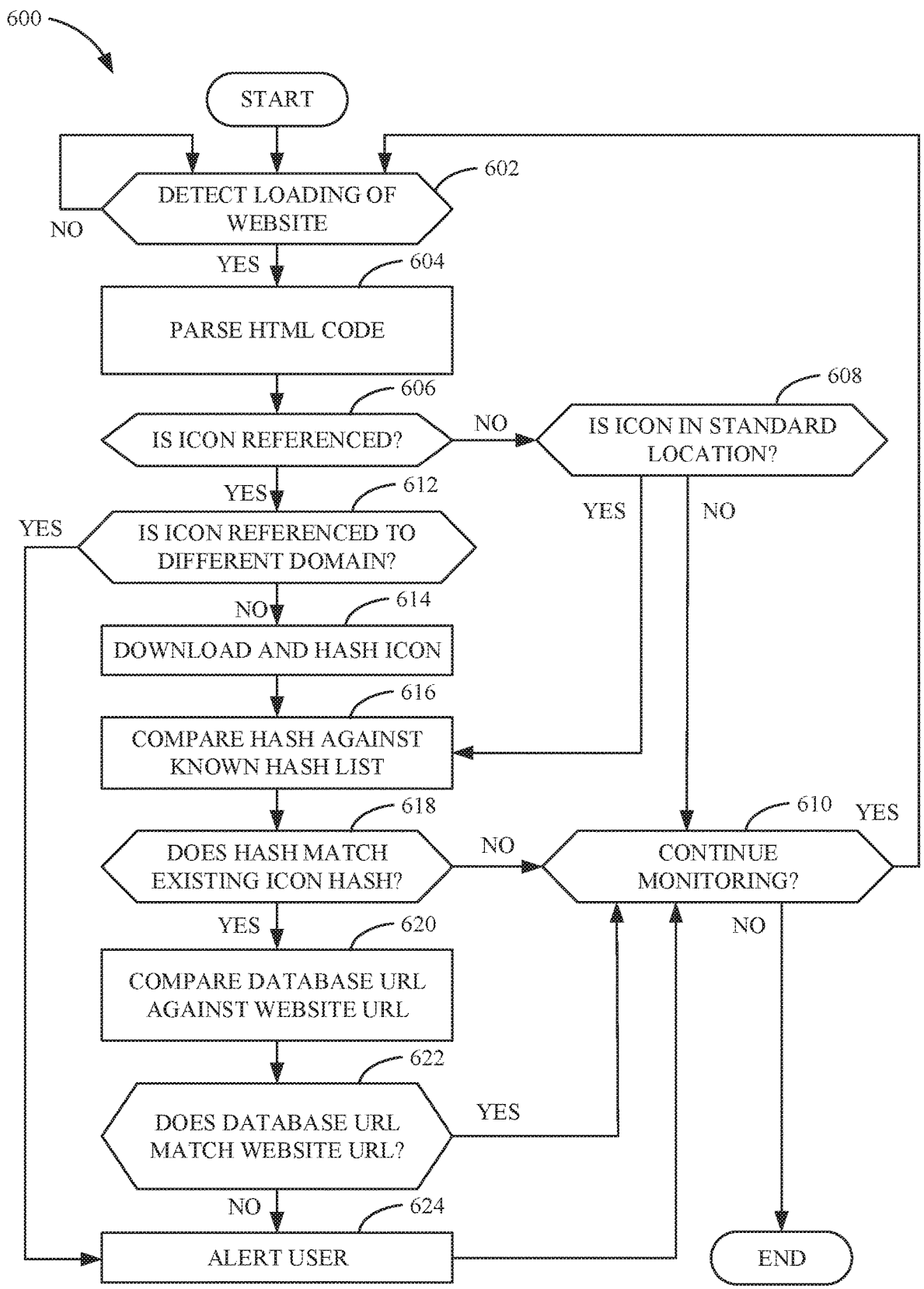
FIG. 6 is a flowchart representative of machine readable instructions which may be executed to implement the example phishing detection controller of FIGS. 1, 2, and 4 to detect whether an unknown website is a phishing website.

FIG. 6 is a flowchart representative of machine readable instructions 600 which may be executed to implement the example phishing detection controller 100 of FIGS. 1, 2, and 4 to detect whether a website is a phishing website. The example instructions 600 begin upon initialization of the example phishing detection controller 100. In some examples, the instructions 600 may begin execution upon initialization of the browser 106 to, for example, provide phishing detection protection while a user is using the browser 106 (or another application).

The example website detector 402 determines whether loading of a website is detected (block 602). The detecting may be performed by, for example, monitoring the browser 106 for an event indicating navigation to a website, monitoring network communications into and/or out of the browser 106 (or other application) to detect loading of a website, etc. If no loading of a website is detected, control proceeds to block 602 where the example website detector 402 continues to monitor for loading of a website.

In response to the website detector 402 detecting that the user device 104 is loading a website (e.g., block 602 returns a result of YES), the example code parser 404 parses HTML code of the website (block 604). In some examples, the parsed HTML code includes a reference to a website icon for the website. The example reference checker 406 determines whether the parsed HTML code includes the reference to the website icon (block 606). If the example reference checker 406 determines that the HTML code does not include the reference to the website icon (e.g., block 606 returns a result of NO), the example location checker 408 determines whether the website icon is located at a standard location. In some examples, a standard location may be the domain of the website visited, followed by a standard icon name, such as "favicon.ico". The location checker 408 determines whether the website icon is located at the standard location (block 608). In response to the location checker 408 locating the website icon at the standard location (e.g., block 608 returns a result of YES), control proceeds to block 614, where the identified icon is used to determine whether the website is a phishing website. If, instead, no icon is identified, (e.g., block 608 returns a result of NO), no determination of whether the website is a phishing website can be made based on the icon. Control proceeds to block 610, where the example website detector 402 determines whether to continue monitoring (block 610). If monitoring is to continue (e.g., block 610 returns a result of YES), control proceeds to block 602. If monitoring is not to continue (e.g., block 610 returns a result of NO), the example process 600 of FIG. 6 terminates. Returning to block 606, if the example reference checker 406 determines that the parsed HTML code includes the reference to the website icon (e.g., block 606 returns a result of YES), the reference checker 406 determines whether the website icon is hosted at a different domain than the domain of the website (block 612). In some examples, a phishing website may include a reference to a known website to attempt to cause a browser to re-use the icon hosted at the known website. Such activity is not typically performed by legitimate websites, which traditionally host their own website icons. If the website icon is hosted at the different domain (e.g., block 612 returns a result of YES), control proceeds to block 624, where the user is alerted to the possibility of the website being a phishing website.

If the reference checker 406 determines that the website icon is not referenced to a different domain than the domain of the website (e.g., block 612 returns a result of NO), the icon hasher 410 generates a hash of the website icon (block 614). In some examples, the icon hasher 410 downloads a copy of the icon (e.g., an additional request is transmitted to the website). However, in some examples, the icon may be accessed via the browser 106 (e.g., via a local cache of the browser 106).

The example hash checker 414 compares the hash of the website icon against a list of known hashes stored in the local icon hash database 412 of FIG. 4 and/or the icon hash database 120 of FIGS. 1, 2, and/or 3 (block 616).

The hash checker 414 determines whether the hash of the website icon matches an existing icon hash in the list of known hashes stored in the local icon hash database 412 and/or the icon hash database 120 (block 618). In response to the hash checker 414 determining that the hash of the website icon does not match any one of the existing icon hashes in the list of known hashes (e.g., block 618 returns a result of NO), the hash checker 414 determines that the unknown website is not a phishing website and control proceeds to block 610. If the hash checker 414 determines that the hash of the website icon matches an existing icon hash in the list of known hashes (e.g., block 618 returns a result of YES), the example hash checker 414 compares the URL of the visited website to a database URL corresponding to the existing icon hash. Performing such a comparison enables the phishing detection controller 100 to confirm that the icon is being used in connection with a known website (as opposed to a phishing website).

The hash checker 414 compares the URL of the website to the database URL corresponding to the existing icon hash (block 620). In this example, the existing icon hash and the database URL correspond to a known legitimate website. In some examples, the database URL and the existing hash icon are stored in a hash entry of the local icon hash database 412 and/or the icon hash database 120.

The hash checker 414 determines whether the database URL matches the URL of the unknown website (block 622). In response to the hash checker 414 determining that the database URL matches the URL of the unknown website (e.g., block 622 returns a result of YES), the hash checker 414 determines that the unknown website is not a phishing website and control proceeds to block 610.

If the example hash checker 414 determines that the database URL does not match the URL of the visited website (e.g., block 622 returns a result of NO), control proceeds to block 624, where the alert generator 416 alerts a user of the user device 104 that the unknown website is a phishing website.

In examples disclosed herein, the alert generator 416 alerts a user of the user device 104 that the unknown website is a phishing website (block 624). In some examples, the alert causes display of a visual indicator (e.g., a pop-up) to alert the user. In some examples, an audible alert may be provided (e.g., a sound) to indicate that the visited website may be a phishing website. In some examples, the alert generator 416 causes navigation to the website to be blocked, and/or may require an additional action from the user before allowing navigation to the website (e.g., the user must acknowledge that they are about to visit a phishing website). Control then proceeds to block 610, where the example website detector 402 determines whether to continue monitoring (block 610). If monitoring is to continue (e.g., block 610 returns a result of YES), control proceeds to block 602. If monitoring is not to continue (e.g., block 610 returns a result of NO), the example process 600 of FIG. 6 terminates. The example process 600 of FIG. 6 may be executed again upon, for example, re-initialization of the browser 106.

Figure 7:
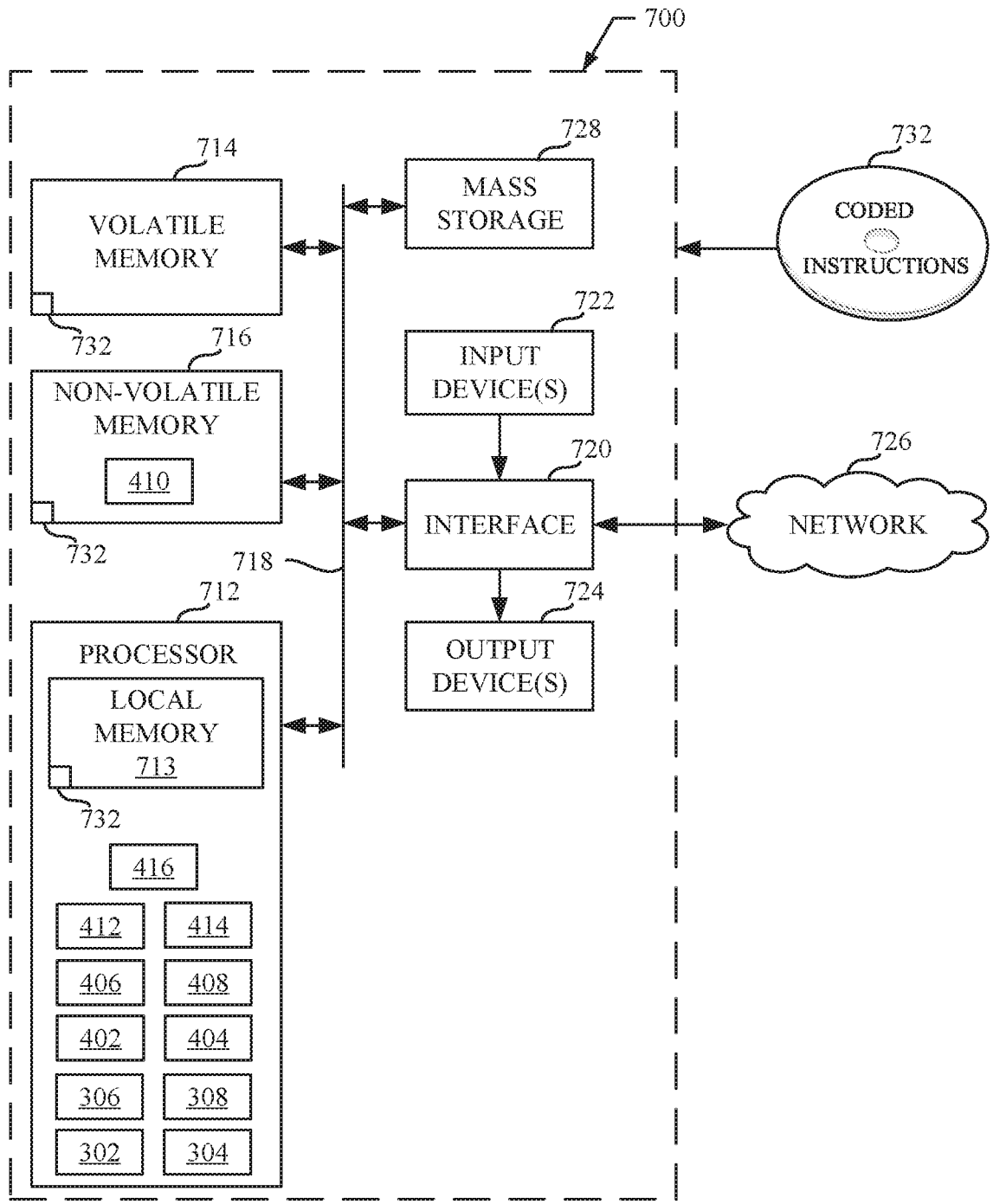
FIG. 7 is a block diagram of an example processing platform structured to execute the instructions of FIGS. 5 and/or 6 to implement the example icon hash database controller of FIGS. 1 and/or 3 and/or the example phishing detection controller of FIGS. 1, 2, and 4.

FIG. 7 is a block diagram of an example processor platform 700 structured to execute the instructions of FIGS. 5 and/or 6 to implement the icon hash database controller 118 and/or the phishing detection controller 100 of FIGS. 3 and/or 4. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the database code parser 302, the reference detector 304, the location detector 306, the hash generator 308, the website detector 402, the code parser 404, the reference checker 406, the location checker 408, the icon hasher 410, the hash checker 414, and the alert generator 416.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5 and/or 6 may be stored in the mass storage device 728, in the volatile memory 714, in the non-volatile memory 716, and/or on a removable non-transitory computer readable storage medium such as a CD or DVD.

Figure 8:
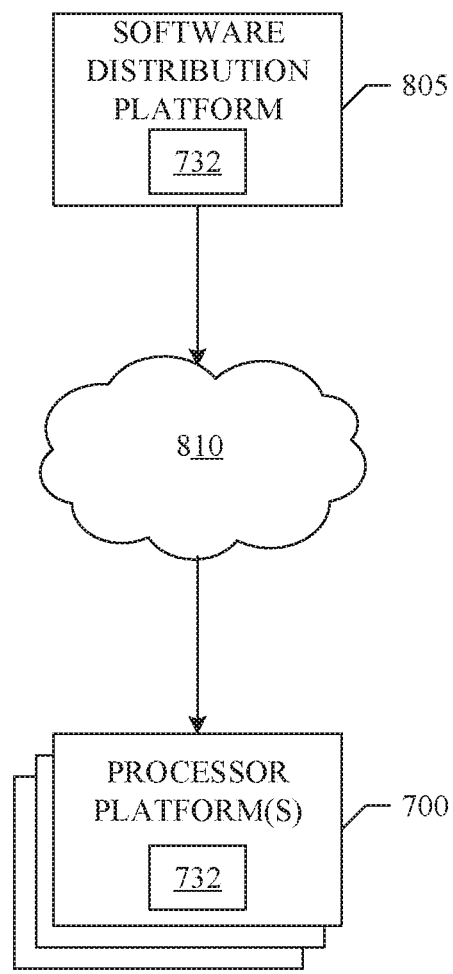
FIG. 8 is a block diagram of an example software distribution platform to distribute software (e.g., software corresponding to the example computer readable instructions of FIGS. 5 and 6) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 805 to distribute software such as the example computer readable instructions 732 of FIG. 7 to third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIG. 7. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the computer readable instructions 732, which may correspond to the example computer readable instructions 500, 600 of FIGS. 5 and/or 6, as described above. The one or more servers of the example software distribution platform 805 are in communication with a network 810, which may correspond to any one or more of the Internet and/or any of the example networks 108 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 732 from the software distribution platform 805. For example, the software, which may correspond to the example computer readable instructions 732 of FIG. 7, may be downloaded to the example processor platform 700, which is to execute the computer readable instructions 732 to implement the example icon hash database controller 118 and/or the example phishing detection controller 100. In some example, one or more servers of the software distribution platform 805 periodically offer, transmit, and/or force updates to the software (e.g., the example computer readable instructions 732 of FIG. 7) to ensure improvements, patches, updates, etc. are distributed and applied to the software at the end user devices.

From the foregoing, it will be appreciated that example methods, apparatus and articles of manufacture have been disclosed that protect a user of a computing device from phishing-based attacks. The disclosed methods, apparatus and articles of manufacture improve the efficiency of using a computing device by reducing the processor load and improving processor performance by automatically detecting malicious websites and, as such, reducing computing resources spent on displaying the malicious websites. The disclosed methods, apparatus and articles of manufacture are accordingly directed to one or more improvement(s) in the functioning of a computer.

The following pertain to further examples disclosed herein.

Example 1 includes an apparatus for detecting a phishing website based on website icons. The example apparatus includes a parser to locate a first website icon corresponding to a first website, an icon hasher to generate a first hash of the first website icon, and a hash checker to determine whether the first hash matches a second hash of a second website icon corresponding to a second website in an icon hash database, the hash checker to, in response to the first hash matching the second hash, determine whether a first portion of a first Uniform Resource Locator (URL) corresponding to the first website matches a second portion of a second URL corresponding to the second website, the hash checker to, in response to the first portion not matching the second portion, identify the first website as a phishing website.

Example 2 includes the apparatus of Example 1, and further includes an icon hash database controller to generate a plurality of hash entries of the icon hash database, the icon hash database controller to parse code of a known non-phishing website to locate a reference to a website icon corresponding to the known non-phishing website, download the website icon, hash the website icon based on a hashing algorithm, and store the hash of the website icon and a third URL corresponding to the known non-phishing website as a hash entry of the icon hash database.

Example 3 includes the apparatus of Example 2, where the icon hash database controller is to, in response to not locating the website icon, determine whether the website icon is at a standard location of the known non-phishing website, and, in response to determining that the website icon is not at the standard location, determine that no website icon exists for the known non-phishing website.

Example 4 includes the apparatus of Example 2, where the hashing algorithm is a MD5 hashing algorithm.

Example 5 includes the apparatus of Example 1, and further includes a reference checker to identify a first domain of the first website icon, and, in response to the first domain not matching the first portion of the first URL, determine that the first website is a phishing website, the first portion of the first URL representing a domain of the first website.

Example 6 includes the apparatus of Example 5, and further includes an alert generator to, in response to at least one of the reference checker or the hash checker determining that first website is the phishing website, block the first website.

Example 7 includes the apparatus of Example 1, and further includes a location checker to, in response to the parser not locating the first website icon, determine whether the first website icon is at a standard location, and, in response to determining that the first website icon is not at the standard location, determine that no website icon exists for the first website.

Example 8 includes a method to detect a phishing website based on website icons. The example method includes locating a first website icon corresponding to a first website, generating a first hash of the first website icon, determining whether the first hash matches a second hash of a second website icon corresponding to a second website in an icon hash database, in response to the first hash matching the second hash, determining whether a first portion of a first Uniform Resource Locator (URL) corresponding to the first website matches a second portion of a second URL corresponding to the second website, and, in response to the first portion not matching the second portion, identifying the first website as a phishing website.

Example 9 includes the method of Example 8, and further includes generating a plurality of hash entries of the icon hash database by parsing code of a known non-phishing website to locate a reference to a website icon corresponding to the known non-phishing website, downloading the website icon, hashing the website icon based on a hashing algorithm, and storing the hash of the website icon and the third URL corresponding to the known non-phishing website as a hash entry of the icon hash database.

Example 10 includes the method of Example 9, and further includes, in response to not locating the website icon, determining whether the website icon is at a standard location of the known non-phishing website, and, in response to determining that the website icon is not at the standard location, determining that no website icon exists for the known non-phishing website.

Example 11 includes the method of Example 9, where the hashing algorithm is a MD5 hashing algorithm.

Example 12 includes the method of Example 8, and further includes identifying a first domain of the first website icon, and, in response to the first domain not matching the first portion of the first URL, determining that the first website is a phishing website, the first portion of the first URL representing a domain of the first website.

Example 13 includes the method of Example 12, and further includes, in response to determining that first website is the phishing website, at least one of blocking the first website or generating a message to alert a user.

Example 14 includes the method of Example 8, and further includes, in response to not locating the first website icon, determining whether the first website icon is at a standard location, and, in response to determining that the first website icon is not at the standard location, determining that no website icon exists for the first website.

Example 15 includes at least one non-transitory computer readable storage medium comprising instructions that, when executed, cause a machine to at least locate a first website icon corresponding to a first website, generate a first hash of the first website icon, determine whether the first hash matches a second hash of a second website icon corresponding to a second website in an icon hash database, in response to the first hash matching the second hash, determine whether a first portion of a first Uniform Resource Locator (URL) corresponding to the first website matches a second portion of a second URL corresponding to the second website, and, in response to the first portion not matching the second portion, identify the first website as a phishing website.

Example 16 includes the at least one non-transitory computer readable storage medium of Example 15, wherein the instructions, when executed, cause the machine to generate a hash entry corresponding to a known non-phishing website by parsing code of a known non-phishing website to locate a reference to a website icon corresponding to the known non-phishing website, downloading the website icon, hashing the website icon based on a hashing algorithm, and storing the hash of the website icon and the third URL corresponding to the known non-phishing website as a hash entry of the icon hash database.

Example 17 includes the at least one non-transitory computer readable storage medium of Example 16, wherein the instructions, when executed, cause the machine to, in response to not locating the website icon, determine whether the website icon is at a standard location of the known non-phishing website, and, in response to determining that the website icon is not at the standard location, determine that no website icon exists for the known non-phishing website.

Example 18 includes the at least one non-transitory computer readable storage medium of Example 16, wherein the instructions, when executed, cause the machine to hash the website icon based on a MD5 hashing algorithm.

Example 19 includes the at least one non-transitory computer readable storage medium of Example 15, wherein the instructions, when executed, cause the machine to identify a first domain of the first website icon, and, in response to the first domain not matching the first portion of the first URL, determine that the first website is a phishing website, the first portion of the first URL representing a domain of the first website.

Example 20 includes the at least one non-transitory computer readable storage medium of Example 19, wherein the instructions, when executed, cause the machine to generate a message to alert a user in response to determining that first website is a phishing website.

Example 21 includes the at least one non-transitory computer readable storage medium of Example 15, wherein the instructions, when executed, cause the machine to, in response to not locating the first website icon, determine whether the first website icon is at a standard location, and, in response to determining that the first website icon is not at the standard location, determine that no website icon exists for the first website.

Example 22 includes a server to distribute first software on a network. The example server includes at least one storage device including second instructions, and at least one processor to execute the second instructions to transmit first instructions over the network, the first instructions, when executed, to cause at least one device to locate a first website icon corresponding to a first website, generate a first hash of the first website icon, determine whether the first hash matches a second hash of a second website icon corresponding to a second website in an icon hash database, in response to the first hash matching the second hash, determine whether a first portion of a first Uniform Resource Locator (URL) corresponding to the first website matches a second portion of a second URL corresponding to the second website, and, in response to the first portion not matching the second portion, identify the first website as a phishing website.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for detecting a phishing web site based on web site icons, the apparatus comprising:
   parser circuitry to locate a first web site icon corresponding to a first web site;
   icon hasher circuitry to generate a first hash of the first web site icon; and
   hash checker circuitry to determine whether the first hash matches a second hash of a second website icon corresponding to a second website in an icon hash database, the hash checker circuitry to, in response to the first hash matching the second hash, determine whether a first portion of a first Uniform Resource Locator (URL) corresponding to the first web site matches a second portion of a second URL corresponding to the second web site, the hash checker circuitry to, in response to the first portion not matching the second portion, identify the first website as a phishing website.

2. The apparatus as defined in claim 1, further including icon hash database controller circuitry to generate a plurality of hash entries of the icon hash database, the icon hash database controller circuitry to:
   parse code of a known non-phishing web site to locate a reference to a web site icon corresponding to the known non-phishing website;
   download the website icon;
   hash the website icon based on a hashing algorithm; and
   store the hash of the website icon and a third URL corresponding to the known non-phishing website as a hash entry of the icon hash database.

3. The apparatus as defined in claim 2, wherein the icon hash database controller circuitry is to:
   in response to not locating the website icon, determine whether the website icon is at a standard location of the known non-phishing website; and
   in response to determining that the website icon is not at the standard location, determine that no website icon exists for the known non-phishing website.

4. The apparatus as defined in claim 2, wherein the hashing algorithm is a MD5 hashing algorithm.

5. The apparatus as defined in claim 1, further including reference checker circuitry to:
   identify a first domain of the first website icon; and
   in response to the first domain not matching the first portion of the first URL, determine that the first website is a phishing website, the first portion of the first URL representing a domain of the first website.

6. The apparatus as defined in claim 5, further including alert generator circuitry to, in response to at least one of the reference checker circuitry or the hash checker circuitry determining that first website is the phishing website, block the first website.

7. The apparatus as defined in claim 1, further including location checker circuitry to:
   in response to the parser circuitry not locating the first website icon, determine whether the first website icon is at a standard location; and
   in response to determining that the first website icon is not at the standard location, determine that no website icon exists for the first website.

8. A method to detect a phishing website based on website icons, the method comprising:
locating a first website icon corresponding to a first website;
generating a first hash of the first website icon;
determining whether the first hash matches a second hash of a second website icon corresponding to a second website in an icon hash database;
in response to the first hash matching the second hash, determining whether a first portion of a first Uniform Resource Locator (URL) corresponding to the first website matches a second portion of a second URL corresponding to the second website; and
in response to the first portion not matching the second portion, identifying the first website as a phishing website.

9. The method as defined in claim 8, further including generating a plurality of hash entries of the icon hash database by:
parsing code of a known non-phishing website to locate a reference to a website icon corresponding to the known non-phishing website;
downloading the website icon;
hashing the website icon based on a hashing algorithm; and
storing the hash of the website icon and a third URL corresponding to the known non-phishing website as a hash entry of the icon hash database.

10. The method as defined in claim 9, further including:
in response to not locating the website icon, determining whether the website icon is at a standard location of the known non-phishing website; and
in response to determining that the website icon is not at the standard location, determining that no website icon exists for the known non-phishing website.

11. The method as defined in claim 9, wherein the hashing algorithm is a MD5 hashing algorithm.

12. The method as defined in claim 8, further including:
identifying a first domain of the first website icon; and
in response to the first domain not matching the first portion of the first URL, determining that the first website is a phishing website, the first portion of the first URL representing a domain of the first website.

13. The method as defined in claim 12, further including, in response to determining that first website is the phishing website, at least one of blocking the first website or generating a message to alert a user.

14. The method as defined in claim 8, further including:
in response to not locating the first website icon, determining whether the first website icon is at a standard location; and
in response to determining that the first website icon is not at the standard location, determining that no website icon exists for the first website.

15. At least one non-transitory computer readable storage medium comprising instructions that, when executed, cause a machine to at least:
locate a first website icon corresponding to a first website;
generate a first hash of the first website icon;
determine whether the first hash matches a second hash of a second website icon corresponding to a second website in an icon hash database;
in response to the first hash matching the second hash, determine whether a first portion of a first Uniform Resource Locator (URL) corresponding to the first web site matches a second portion of a second URL corresponding to the second web site; and
in response to the first portion not matching the second portion, identify the first website as a phishing web site.

16. The at least one non-transitory computer readable storage medium as defined in claim 15, wherein the instructions, when executed, cause the machine to generate a hash entry corresponding to a known non-phishing website by:
parsing code of a known non-phishing web site to locate a reference to a web site icon corresponding to the known non-phishing web site;
downloading the website icon;
hashing the website icon based on a hashing algorithm; and
storing the hash of the website icon and a third URL corresponding to the known non-phishing website as a hash entry of the icon hash database.

17. The at least one non-transitory computer readable storage medium as defined in claim 16, wherein the instructions, when executed, cause the machine to:
in response to not locating the website icon, determine whether the website icon is at a standard location of the known non-phishing website; and
in response to determining that the website icon is not at the standard location, determine that no website icon exists for the known non-phishing website.

18. The at least one non-transitory computer readable storage medium as defined in claim 16, wherein the instructions, when executed, cause the machine to hash the website icon based on a MD5 hashing algorithm.

19. The at least one non-transitory computer readable storage medium as defined in claim 15, wherein the instructions, when executed, cause the machine to:
identify a first domain of the first website icon; and
in response to the first domain not matching the first portion of the first URL, determine that the first website is a phishing website, the first portion of the first URL representing a domain of the first website.

20. The at least one non-transitory computer readable storage medium as defined in claim 19, wherein the instructions, when executed, cause the machine to or generate a message to alert a user in response to determining that first website is a phishing website.

21. The at least one non-transitory computer readable storage medium as defined in claim 15, wherein the instructions, when executed, cause the machine to:
in response to not locating the first website icon, determine whether the first website icon is at a standard location; and
in response to determining that the first website icon is not at the standard location, determine that no website icon exists for the first website.

22. A server to distribute first software on a network, the server comprising:
at least one storage device including second instructions; and
at least one processor to execute the second instructions to transmit first instructions over the network, the first instructions, when executed, to cause at least one device to:
locate a first website icon corresponding to a first website;
generate a first hash of the first website icon;
determine whether the first hash matches a second hash of a second website icon corresponding to a second website in an icon hash database;
in response to the first hash matching the second hash, determine whether a first portion of a first Uniform Resource Locator (URL) corresponding to the first website matches a second portion of a second URL corresponding to the second website; and in response to the first portion not matching the second portion, identify the first website as a phishing website.

23. An apparatus for detecting a phishing website based on website icons, the apparatus comprising:
   means for locating a first website icon corresponding to a first website;
   means for hashing to generate a first hash of the first website icon; and
   means for checking to determine whether the first hash matches a second hash of a second website icon corresponding to a second website in an icon hash database, the means for checking to, in response to the first hash matching the second hash, determine whether a first portion of a first Uniform Resource Locator (URL) corresponding to the first web site matches a second portion of a second URL corresponding to the second web site, the means for checking to, in response to the first portion not matching the second portion, identify the first website as a phishing website.

24. The apparatus of claim 23, further including means for controlling to:
   generate a plurality of hash entries of the icon hash database;
   parse code of a known non-phishing web site to locate a reference to a web site icon corresponding to the known non-phishing web site;
   download the website icon;
   hash the website icon based on a hashing algorithm; and
   store the hash of the website icon and a third URL corresponding to the known non-phishing website as a hash entry of the icon hash database.

25. The apparatus of claim 24, wherein the means for controlling is to:
   in response to not locating the website icon, determine whether the website icon is at a standard location of the known non-phishing website; and
   in response to determining that the website icon is not at the standard location, determine that no website icon exists for the known non-phishing website.

26. The apparatus of claim 24, wherein the hashing algorithm is a MD5 hashing algorithm.

27. The apparatus of claim 23, further including means for reference checking to:
   identify a first domain of the first website icon; and
   in response to the first domain not matching the first portion of the first URL, determine that the first website is a phishing website, the first portion of the first URL representing a domain of the first website.

28. The apparatus of claim 27, further including means for alerting to, in response to at least one of the means for reference checking or the means for hashing determining that first website is the phishing website, block the first website.

* * * * *